W. W. LEYRER.
FIGURE WHEELED TOY.
APPLICATION FILED OCT. 20, 1920.
1,411,737. Patented Apr. 4, 1922.
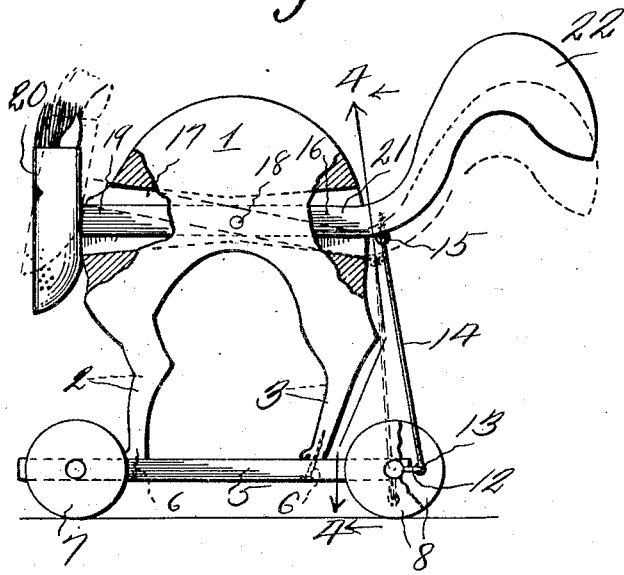
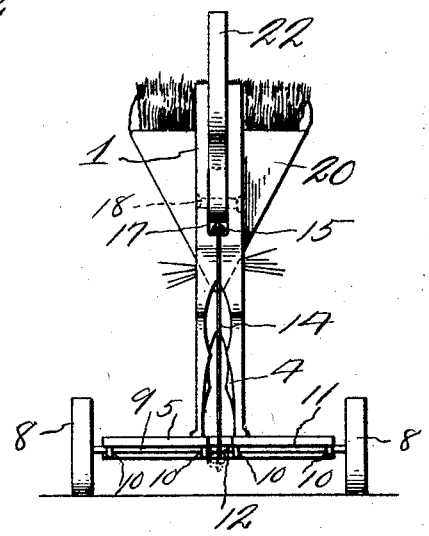
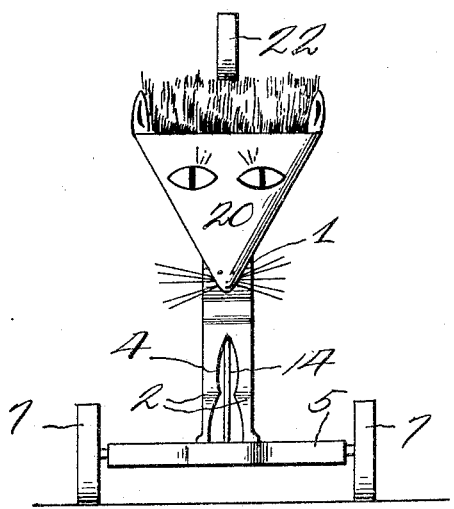
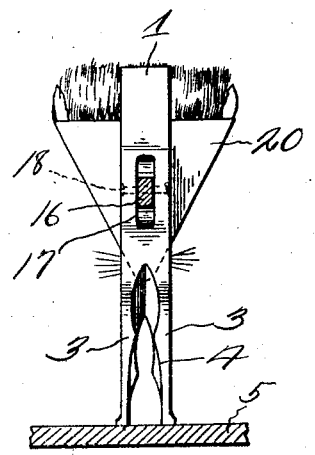
Inventor
Wayne W. Leyrer
By D. Swift
his Attorney

UNITED STATES PATENT OFFICE.

WAYNE W. LEYRER, OF ATLANTIC CITY, NEW JERSEY.

FIGURE WHEELED TOY.

1,411,737.  Specification of Letters Patent.  Patented Apr. 4, 1922.

Application filed October 20, 1920.  Serial No. 418,193.

*To all whom it may concern:*

Be it known that I, WAYNE W. LEYRER, a citizen of the United States, residing at Atlantic City, in the county of Atlantic, State of New Jersey, have invented a new and useful Figure Wheeled Toy; and I do hereby declare the following to be a full, clear, and exact description of the invention, such as will enable others skilled in the art to which it appertains to make and use the same.

The invention relates to toys and has for its object to provide a figure wheeled toy comprising a base having preferably thereon a figure in the form of an animal, preferably a cat and to provide a longitudinally disposed aperture extending through the body of the animal, said aperture having rockably mounted in a pin thereon a member, the forward end of which has secured thereto a head and the rear end thereof terminating in a tail. Also to provide a connecting rod having its upper end secured to the cat's tail adjacent the body and its lower end connected to a crank carried by the rear axle of the wheel supported base.

With the above and other objects in view the invention resides in the combination and arrangement of parts as hereinafter set forth, shown in the drawings, described and claimed it being understood that changes in the precise embodiment of the invention may be made within the scope of what is claimed without departing from the spirit of the invention.

In the drawings:—

Figure 1 is a side elevation of the toy, parts being broken away to better show the structure.

Figure 2 is a rear view of the toy.

Figure 3 is a front view.

Figure 4 is a vertical sectional view taken on line 4—4 of Figure 1.

Referring to the drawings, the numeral 1 designates the body of the animal and 2 and 3 the front and rear legs thereof. The body 1 and legs 2 and 3 are integrally formed from the same piece of material, said legs being formed by cutting away material as shown at 4 thereby forming spaced legs. The animal is secured to the base 5 by means of nails 6 which pass upwardly through the base and into the legs 2 and 3, it being understood though that the securing means may be of any kind desired. Pivotally secured to the sides of the base 5 adjacent its front edge are supporting wheels 7, the rear wheels 8 being carried by the crank shaft 9 rotatably mounted in bearings 10 at the rear of the base 5, said crank shaft being preferably disposed in a transverse recess 11 in the rear end of the base. Centrally disposed on the crank shaft 9 is a crank and to said crank 12 is pivotally connected as at 13 the lower end of an upwardly extending connecting rod 14, said connecting rod having its upper end pivotally connected as at 15 to the under face of a rockable member 16. Rockable member 16 is substantially horizontally disposed and rockable in a longitudinally disposed aperture 17 which passes through the body 1 of the animal and is pivoted therein by means of a pin 18 which passes through the body 1 and through the rockable lever 16. As the toy is moved over the ground with its wheels in engagement with the ground, it will be seen that the crank 12 will force the connecting rod 14 upwardly, thereby rocking the rockable lever on its pivotal pin 18. This action will cause an upward and downward movement of the forward end 19 of the lever, thereby causing the head 20 of the animal to simulate a natural movement of the head of an animal when running or moving and especially a cat when mad with its back humped. The rear end 21 of the pivoted lever 16 extends upwardly and is shaped to represent a tail of a cat. It will be noted that as the toy is moved over the ground and the pivoted levers 16 oscillated on the pin 18 that as the head 20 moves upwardly that the tail 22 will move downwardly, thereby simulating the natural movement of an animal when running.

From the above it will be seen that a toy is provided, which as it moves over the ground will simulate the action of an animal and one wherein the parts are reduced to a minimum and one which may be manufactured at a small cost.

The invention having been set forth what is claimed as new and useful is:—

A figure wheeled toy comprising a horizontally disposed base, wheels for supporting said base, a body supported above said base and representing a four-legged animal and having a substantially horizontally disposed opening extending longitudinally therethrough and spaced from the base, a horizontally disposed bar extending through said opening and pivotally centrally of the opening and of the body, the rear end of the bar terminating in an integral member representing the tail of the animal being larger than the opening in the body, a detachable member carried by the other end of the bar and representing the head of the animal, a crank shaft carried by the base and operated by wheels, a connecting rod carried by said crank shaft, said connecting rod extending upwardly substantially vertically and having its upper end pivotally connected to the rear end of the horizontally disposed bar adjacent the rear end of the opening through the body member.

In testimony whereof I have signed my name to this specification in the presence of two subscribing witnesses.

WAYNE W. LEYRER.

Witnesses:
JOHN KUESTNER, Jr.,
RUTH A. BETTS.